United States Patent [19]
Huijer et al.

[11] Patent Number: 4,949,198
[45] Date of Patent: Aug. 14, 1990

[54] THERMOMAGNETIC RECORDING HEAD AND MODE OF EMBODIMENT

[75] Inventors: Ernst Huijer, Orsay; Jean C. Lehureau, Geneviève Des Bois; Jean P. Castera, Orsay, all of France

[73] Assignee: Thomson-CSF, Paris, France

[21] Appl. No.: 257,133

[22] Filed: Oct. 11, 1988

Related U.S. Application Data

[63] Continuation of Ser. No. 914,005, Oct. 1, 1986, abandoned.

[30] Foreign Application Priority Data

Oct. 4, 1985 [FR] France .................................. 85 14766

[51] Int. Cl.$^5$ ............................................. G11B 5/02
[52] U.S. Cl. ...................................... 360/59; 360/114; 369/117
[58] Field of Search ................... 360/59, 114; 369/117

[56] References Cited
U.S. PATENT DOCUMENTS

| | | |
|---|---|---|
| 3,438,010 | 4/1969 | Fuller . |
| 3,651,262 | 3/1972 | Korpel . |
| 3,944,992 | 3/1976 | Krumme et al. . |
| 3,970,803 | 7/1976 | Kinzie, Jr. et al. ................... 369/117 |
| 4,144,548 | 3/1979 | Roes ........................................ 360/59 |
| 4,480,258 | 10/1984 | Nishimura et al. .................... 360/59 |
| 4,520,409 | 5/1985 | Kimoto et al. ......................... 360/59 |
| 4,531,137 | 7/1985 | Drews et al. ........................... 360/59 |
| 4,586,092 | 4/1986 | Martens et al. ........................ 360/59 |
| 4,599,658 | 7/1986 | Saitoh et al. ............................ 360/59 |
| 4,610,009 | 9/1986 | Connell ................................... 360/114 |

FOREIGN PATENT DOCUMENTS 770127 3/1975 United Kingdom .

OTHER PUBLICATIONS

Patents Abstracts of Japan, vol. 3, No. 125 (E-145), Oct. 19, 1979, p. 94 E 145; & JP-A-54 103 009 (Ricoh K.K.) 14-08-1979.
Patents Abstracts of Japan, vol. 7, No. 26 (P-172) [1171], Feb. 2, 1983; & JP-A-57 179 907 (Canon K.K.) 05-11-1982.
IBM Technical Disclosure Bulletin, vol. 10, No. 4, Sep. 1967, pp. 420–421, New York, US; D. A. Thompson: "Beam-Operated Memory Element".
Patents Abstracts of Japan, vol. 4, No. 5 (E-165), Jan. 16, 1980, p. 98 E 165; & JP-A-54 146 620 (Matsushita Denki Sangyo K.K.) 16-11-1979.
Patents Abstracts of Japan, vol. 6, No. 156 (P-135) [1034], 17 aout 1982; & JP-A-57 74 814 (Suwa Seikosha K.K.) 11-05-1982.
Patents Abstracts of Japan, vol. 7, NO. 54 (P-180) [1199], Mar. 4, 1983; & JP-A-57 200 918 (Canon K.K.) 13-12-1982.
Patents Abstracts of Japan, vol. 7, No. 57 (P-181) [1202], Mar. 9, 1983; & JP-A-57 203 207 (Canon K.K.) 13-12-1982.
Patents Abstracts of Japan, vol. 9, No. 24 (P-331) [1747], Jan. 31, 1985; & JP-A 59 168 954 (Sanyo Denki K.K.) 22-09-1984.

*Primary Examiner*—Steven L. Stephan
*Attorney, Agent, or Firm*—Oblon, Spivak, McClelland, Maier & Neustadt

[57] ABSTRACT

Thermomagnetic recording head for use in magnetic tape recording, comprising a layer of a ferromagnetic material set in the vicinity of a magnetic recording medium. A heating means is used to heat the layer of ferromagnetic material locally to a temperature that reaches the Curie point of the ferromagnetic material. Each heated zone is thus demagnetized and constitutes a recording gap for the recording medium.

18 Claims, 7 Drawing Sheets

FIG_1

FIG_2

FIG_3

FIG_4

FIG_5

FIG_6

FIG_7

FIG_8

FIG_9

FIG_10

FIG_11

FIG_12

FIG_13

FIG_14

FIG_15

FIG_16

FIG_17

FIG_18

FIG_19

THERMOMAGNETIC RECORDING HEAD AND MODE OF EMBODIMENT

This application is a continuation of application Ser. No. 914,005, filed on Oct. 1, 1986, now abandoned.

BACKGROUND OF THE INVENTION

The invention pertains to a thermomagnetic recording head and to its mode of embodiment, which is particularly well-suited to making very closely packed stacks of magnetic recording heads.

The recording head of the invention can be applied, with particular advantage, to devices that require high-density data recording, whether parallel or sequential. A head of this kind may, for example, be used in a magnetic tape recorder.

As a rule, a magnetic head must develop a field of approximately 1000 Oe, i.e. 80 mA/micrometer. It is difficult to set up such a field by means of a single current turn, and it is thus necessary to make a coil. Hence, a recording head, even one made in the form of a thin film, is a device which cannot be integrated with a pitch of less than 100 micrometers, and this is inadequate for high-density recording.

Acoustical solutions have been proposed, but they do not give the necessary resolution: a resolution of 10 micrometers would correspond to an acoustical pass-band of at least 200 MHz, whereas the magnetostrictive effects do not follow this particular frequency.

Thermomagnetic action gives high frequencies which may attain 1 MHz and enables integration with a typical pitch of 10 micrometers in devices operating by Joule effect and 1 micrometer in devices operating by optical image formation.

There are known devices of this kind in which the recording medium has a relatively low Curie point and enables recording by thermomagnetic action.

But such devices require a recording medium that is adapted to have a Curie point of this degree.

The purpose of the invention is to mitigate the deficiencies of the Prior Art.

The invention can be used to make recordings, by thermomagnetic action, on magnetic media such as standard quality magnetic tapes where the Curie point is not necessarily low.

SUMMARY OF THE INVENTION

The object of the invention is, therefore, a thermomagnetic recording head comprising a data-recording magnetic medium which comprises : a layer of homogeneously magnetized ferromagnetic material with a determined Curie point, the thickness of which is delimited by a first main side and a second main side, the said layer being set so that its first main surface is placed close to the magnetic recording medium; in addition, the medium comprises at least one heat source, placed on the same side as the second main surface of the layer, the heat source being used to raise the temperature of a zone throughout the thickness of the layer from its second main surface to its first main surface until the Curie point of the ferromagnetic material that constitutes the layer is reached.

The invention also pertains to a method for manufacturing such a thermomagnetic recording head, comprising the following stages:

(a) a stage in which a layer of a ferromagnetic material is deposited on a substrate;
(b) a stage in which heating electrodes are laid on one side of a solid-state integrated circuits element;
(c) a stage in which the ferromagnetic layer/substrate unit and the heating electrodes/solid-state element unit are joined with the layer of ferromagnetic material in contact with the heating electrodes;
(d) a stage in which the substrate is eliminated.

BRIEF DESCRIPTION OF THE DRAWINGS

A detailed description of the various objects and characteristics of the invention is given below with reference to the appended figures wherein.

DETAILED DESCRIPTION OF THE INVENTION

Figure 1:
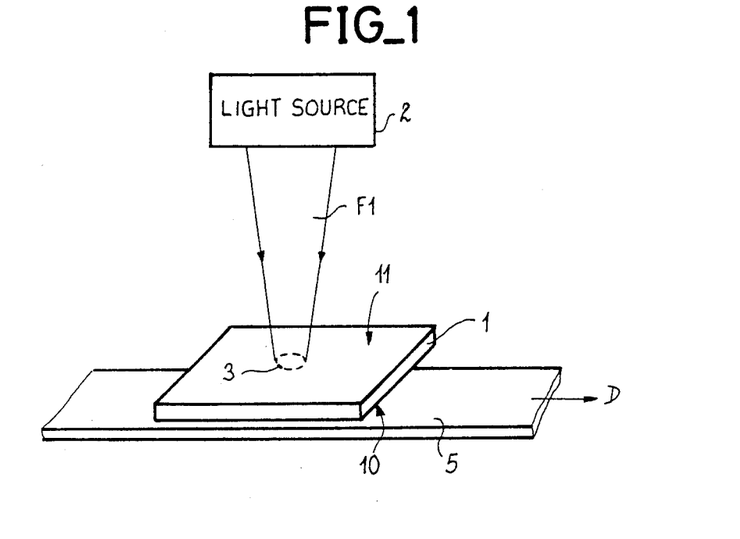
FIG. 1 is a simplified arrangement of the thermomagnetic recording head according to the invention.

Referring to FIG. 1, we shall attempt firstly to describe a simplified arrangement of the recording head according to the invention.

This recording head comprises a layer 1 of a ferromagnetic material possessing a first main side 10 and a second main side 11 which is parallel to the initial side. This layer 1 is placed near a magnetic recording medium, represented in the shape of a magnetic tape 5 in FIG. 1, with the initial side 10 brushing against or even touching the magnetic tape 5. A light source 2 projects a light beam F1 on the second main side 11 of the layer 1. This beam causes the layer 1 to be heated up in depth in the projection zone 3 of the side 11.

The material constituting the layer 1 is magnetized uniformly along the plane of the layer. Its Curie point is relatively low: its value is, for example, 100°. We know that a magnetized material of this type with a determined value loses its magnetization when it is heated up to the Curie point and that it recovers its initial magnetization when it is cooled.

Figure 2:
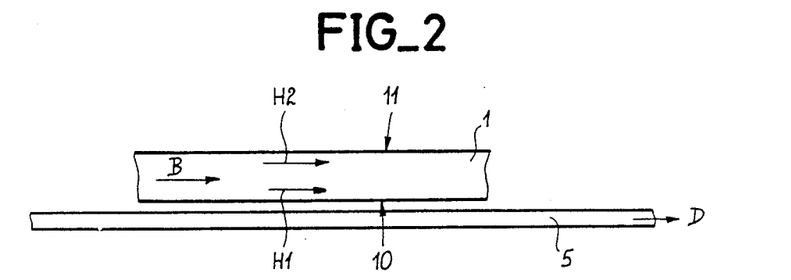
FIGS. 2 and 3 depict an example of the functioning of the head in FIG. 1.
Figure 3:
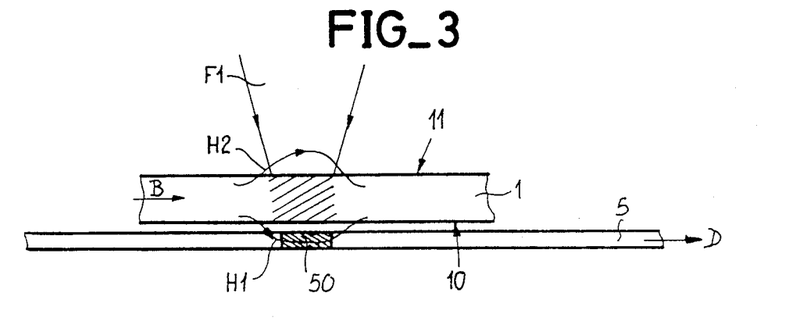

FIGS. 2 and 3 depict the layer of ferromagnetic material 1 and the recording medium 5 placed close to the first main side 10 of the layer 1.

At ambient temperature, the layer 1 is uniformly magnetized and the magnetic field (H1, H2) has but a negligible effect on the magnetic recording medium 5. This medium is subjected only to the field H needed for the magnetization of the layer 1 minus the field created by the magnetic forces distributed at the ends of the layer 1.

If a zone 3 of the layer 1 is heated, using for example, a light beam F1 produced by a source 2 as depicted in FIG. 1, and provided that the Curie point is reached, this zone 3 is demagnetized. Zone 3 constitutes, in the middle of layer 1, a zone of magnetic discontinuity that acts as a gap. The magnetic fields H1, H2 tend to flow over either side of zone 3, as depicted in FIG. 3.

The magnetic recording medium 5, placed near the zone 3 on the surface 10 side, makes it easy for the field H1 to pass through because of its magnetic permeability. By contrast, on the surface 11 side, the field H2 encounters a material such as air which possesses a lower degree of magnetic permeability.

Consequently, when the zone 3 of the layer 1 is heated, magnetization is caused in the magnetic recording medium 5 in the zone 50 of this support which faces the zone 3.

The field developed is essentially that which would be developed by a zone 3 subjected to a reversed magnetization so as to demagnetize it. If the zone 3 is substantially deeper than it is wide, the magnetization of this field is approximately equal to that of the layer 1.

When the heating of zone 3 is eliminated, this zone recovers its original magnetization through the effect of the magnetization of the zones neighbouring the layer 1.

Thus, a magnetic datum is recorded in zone 50 of the recording medium 5. The recording medium 5 (or magnetic tape) can be moved in the direction of the arrow B to record another magnetic datum in a following zone.

Considerations of resistance to wear and tear make it preferable that the layer 1 should be made of an oxide such as Mn Zn ferrite, a hexaferrite or a highly magnetic garnet such as yttrium and iron garnet (YIG) doped with bismuth or scandium.

These oxides have the following thermal characteristics:

Calorific capacity of about C−57/ cm3 / ° C.
Thermal diffusivity of R=0.5 mm 2/s.

In the application of the device of the invention for magnetic tape recording, experience has shown that recording times t can easily be obtained, with lengths l of thermal diffusion in the layer 1 and tape-running speeds v, the approximate values of which are:

$t = 1\ \mu s \quad l = 0.5\ \mu m \quad v = 50\ cm/s$ $t = 10\ \mu s \quad l = 2\ \mu m \quad v = 20\ cm/s$ $t = 100\ \mu s \quad l = 5\ \mu m \quad v = 5\ cm/s$ It will be noted that a tape recording device of this kind can be used to make parallel recording throughout the width of the tape.

A 4 mm recording head of this kind, used to record the entire width of the tape of an audio-micro cassette, would then consume the following amount of power:

P−10 mW/° C., i.e. for a Curie point of about 100 to 120° C., a temperature rise of about 100° C. and a recording peak power of
P=1 W The mean power is in fact, lower since the continuous recording rate may be approximately 50 M bits/s, which is greater than that found in typical applications: i.e. digital video-sound equipment sold in the market.

Figure 4:
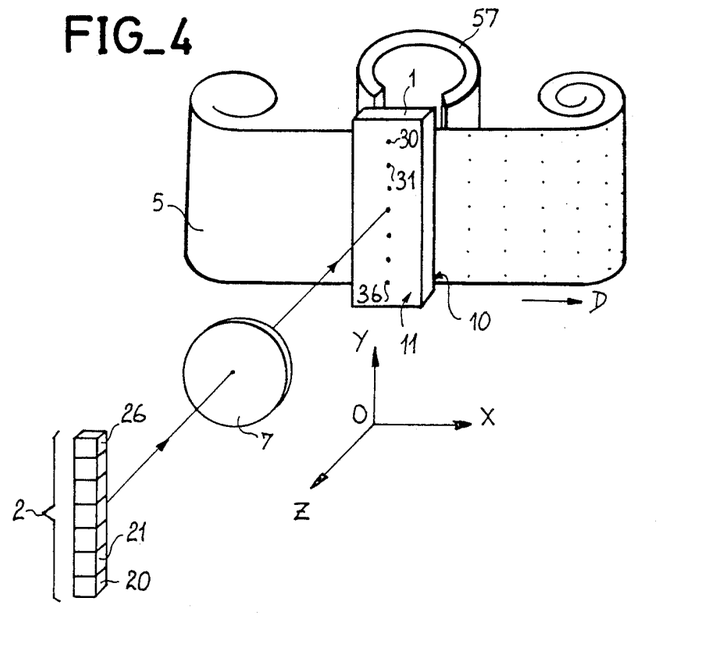
FIG. 4 is a perspective view of an example of an embodiment of the recording head using light sources.
Figure 5:
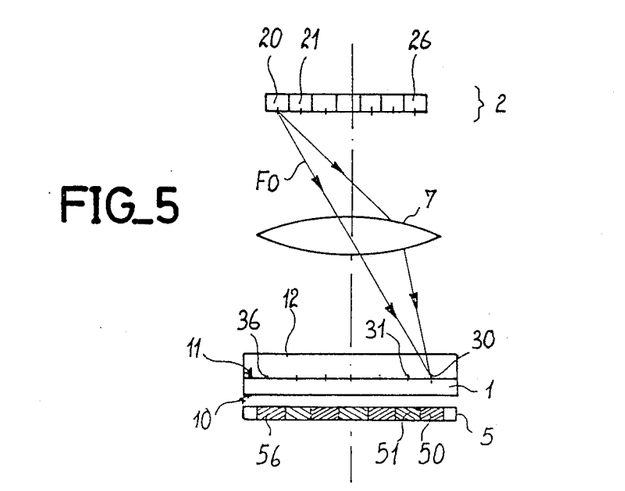
FIG. 5 represents a plane view of the recording head of FIG. 4.

Referring to FIGS. 4 and 5 we shall now describe a detailed example of an embodiment of a playback head according to the invention.

In FIG. 4, this head is oriented according to a reference trihedron OXYZ. FIG. 5 represents a view of this head along a parallel plane or along the plane OYZ. We find a layer 1 deposited on a support 12 visible in FIG. 5. The surface 11 of the layer 1 adheres to the support 12. The surface 10 of the layer 1 is placed near a magnetic recording support which has been depicted in the form of a magnetic tape 5 in FIG. 4. The magnetic tape 5 moves in the direction of the arrow D.

A set 2 of light sources 20, 21 . . . 26 illuminates the surface 11 of the layer 1. These sources may be derived from the section of a GaAs or GaP light-emitting diode for example.

A focusing lens 7 is used to focus each beam emitted by the sources 20 to 26 to the points 30 to 36 respectively of the layer 1.

Thus, as we can see in FIG. 5, a light beam F0 emitted by the source 20 is focused by the lens 7, crosses the support 12 and reaches a point 30 of the layer 1. It then heats a zone located around point 30 and raises the temperature of the material in the zone to the Curie point of the material. The material is demagnetized in this zone. The magnetic flux then passes through the zone 50 of the magnetic tape 5 as was previously explained with respect to FIG. 3.

In the same way, a light beam from the light source 21 reaches the zone 31 so as to magnetize the zone 51 of the tape 5. Every source such as the source 26 also lights up a specific zone (36) of the layer 1 so as to magnetize a zone 56 of the tape 5.

As can be seen in FIG. 4, the light sources 20 to 26 have been arranged along a line that is at right angles to the running direction of the tape 5. These light sources thus make it possible to record data lines 50 to 56 arranged transversely on the tape. The running of the tape thus causes the recording of a succession of lines of data.

It must be noted that this device provides for the simultaneous recording of an entire line, with each line then needing a single recording time.

On the opposite side of the layer from the tape 5, a magnet 57 has been provided for. This magnet generates a weak field in the face of the coercivity of the tape, in such a way that the magnetization of the layer 1 is oriented along the direction of the magnetic tape pigment coating (generally, along the tape running axis). The layer 1 can also be made with a material which is coercive enough to eliminate the risk of its being demagnetized. The heated zone of the layer is then reoriented by its neighbourhood when it is being cooled down.

The support 12 of the layer 1 has been made of a material, such as glass, which is transparent to the light beams emitted by the sources 20 to 26.

Quite clearly, the light sources may be arranged otherwise than in a line. For example, they may be arranged in a two-dimensional matrix to be used in a type of application other than that of magnetic tape recording.

Figure 6:
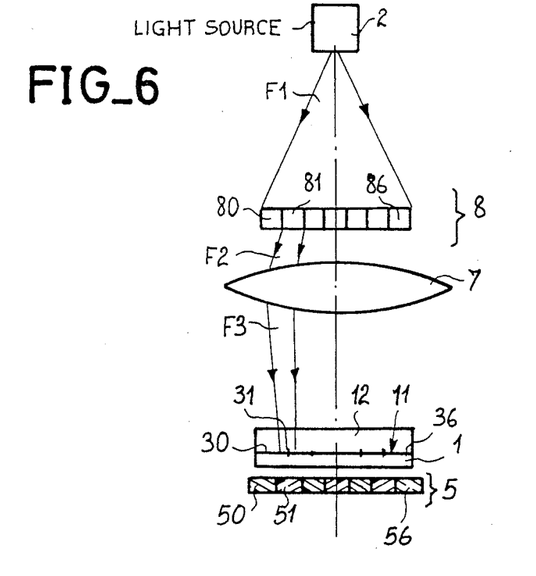
FIG. 6 represents a plane view of a second example of an embodiment of the recording head of the invention using a light source.

Referring to FIG. 6, we shall describe another example of an embodiment of the invention wherein the heating source is also a light source.

To simplify the description, the head of the invention has been depicted in a plane similar to that of FIG. 5.

FIG. 6 again depicts the layer 1 deposited on support 12, the recording medium 5 set near the layer 1 and the focusing lens 7.

However, instead of having a set of light sources, the device of FIG. 6 provides for a single source 2 emitting a divergent beam F1 which illuminates a light valve 8.

The light valve 8 possesses a set of zones 80, 81, . . . 86. These zones are used for the selective retransmission of the beam F1. It is thus that the zone 81 retransmits a part of the beam F1 in the shape of a beam F2 which is focused by the lens 7 in the shape of a beam F3 towards a point 31 of the layer 1.

The valve 8, illuminated by the source 2, thus replaces all the light sources 20 to 26 of the FIGS. 4 and 5.

The functioning of the device of FIG. 6 is thus similar to the one described previously, each zone 80 to 86 being used to illuminate and heat a particular zone 30 to 36 of the layer 1 in order to record data in the zones 50 to 56 of the tape 5.

The light valve 8 can be made, for example, in the shape of a liquid crystal screen comprising cells 80 to 86, each of which may retransmit or not retransmit portions of the beam F1.

The cells 80 to 86 may be aligned to give a mode of embodiment similar to that of FIGS. 4 and 5. They may be arranged in the form of a matrix and may be controlled in the same way as matrix-controlled screens of a known type.

Figure 7:
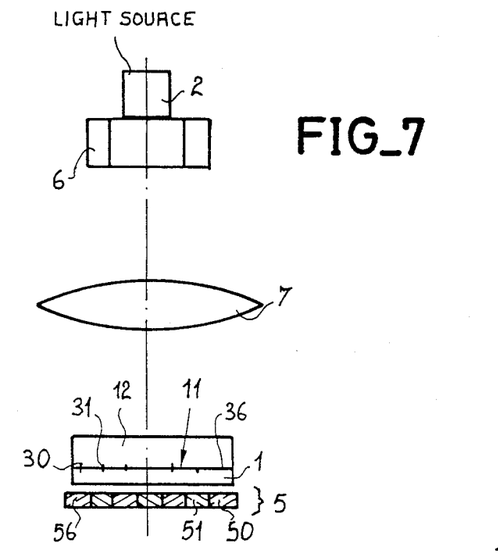
FIG. 7 represents a plane view of a third example of an embodiment of the recording head of the invention using a light source.

According to another example of an embodiment depicted in FIG. 7, there is a single light source 2, but instead of a light valve, there is a deflecting device 6 which is used to deflect the light beam, provided by the source 2, towards a particular zone 30 to 36 of the layer 1. One datum may thus be recorded at a time in a zone 50 to 56 of the recording medium 5.

This type of embodiment can also be used for the parallel recording of a set of data.

Referring to FIGS. 8 to 13, we shall now describe an example of an embodiment of the invention wherein the heating sources are also heating electrodes.

FIG. 8 again depicts the layer 1 with its surface 10 designed to be set near a magnetic recording medium not depicted in the figure.

Figure 8:
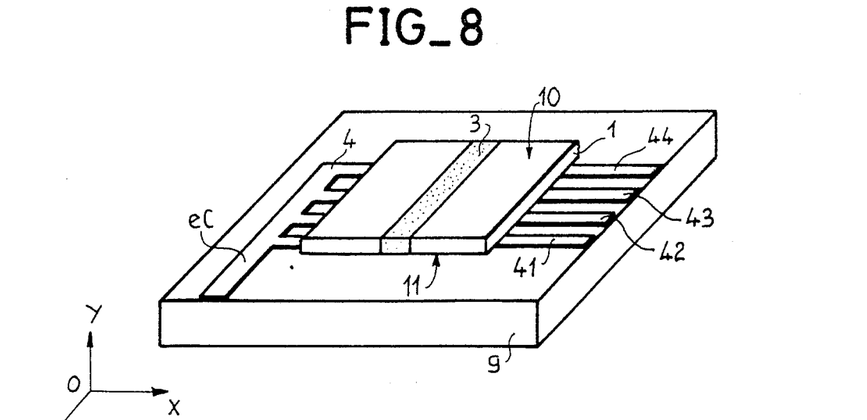
FIG. 8 is a perpsective view showing a mode of embodiment of the recording head of the invention using heating electrodes.

On a substrate 9, there are heating electrodes 41, 42, 43, 44, made of a resistive material and constituting a set of electrodes 4. On these electrodes and on the substrate 9, a layer 1 is deposited.

Figure 9:
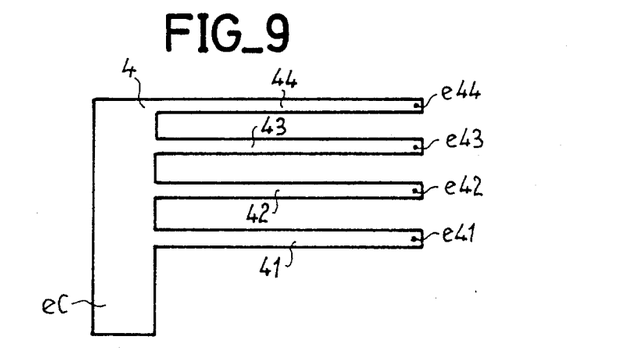
FIGS. 9 to 13 represent configurations of forms of heating electrodes which can be used in the recording head depicted in FIG. 8.

The electrodes 41 to 44 are supplied with current individually between an input, e41 to e44, as shown in FIG. 9, and a common input eC.

The supply to an electrode determines the heating of the layer 1 located beneath this electrode.

To obtain the heating and demagnetization of a limited zone of the layer 1, a layer is used with a relatively high Curie point of 300° to 500° C. for example. In this layer, a strip 3 is made with a much lower Curie point of 100° C., for example. This lowering of the Curie point of the material is done by doping. This doping is done by diffusion or ion implantation, for example.

The strip 3 is made perpendicular to the heating electrodes 41 and 44 in such a way that the heating and demagnetization due to an electrode occur at the intersection of this electrode with the strip 3.

Figure 10:
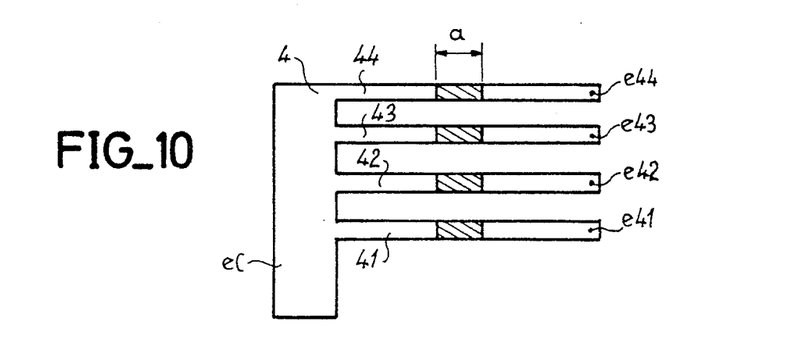

According to a mode of embodiment of the electrodes represented in FIG. 10, an area with a width a of the electrodes 41 to 44, corresponding to the intersection of the layer 3 and of the electrodes, is made more resistive in such a way that the electrodes are heated solely in this zone.

Figure 11:
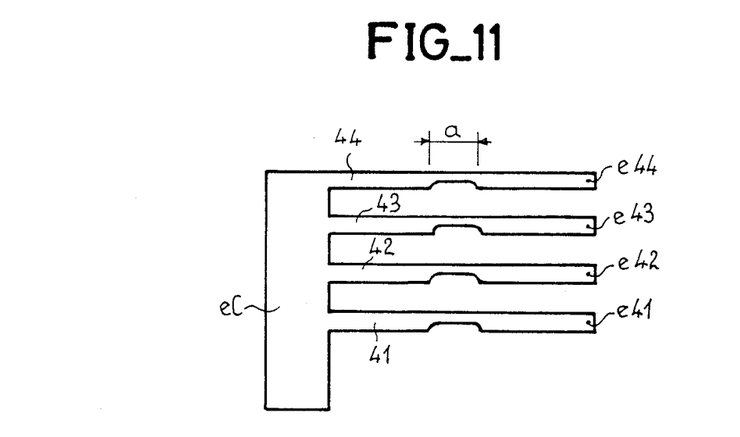

As depicted in FIG. 11, this resistive zone is integrally formed by means of a shrinking of the electrodes 41 to 44 along a length corresponding to the zone with a width a .

Figure 12:
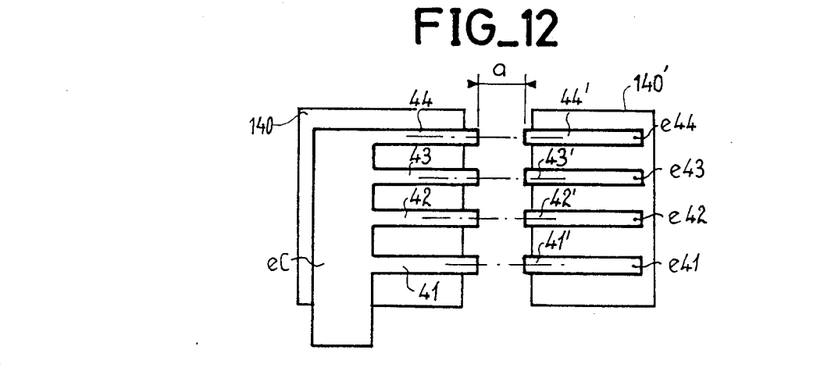
Figure 13:
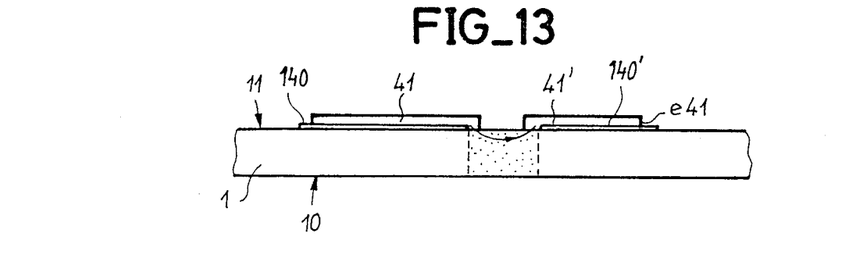

The electrodes heating zone can also be determined by an interruption of about 1 micrometer, for example, in the electrodes. Each electrode then comprises an initial portion (41 to 44) and a second portion (41' to 44') located in the extension of the initial portion. The electrodes 41 to 44 and 41' to 44' are deposited on an insulating layer, 140, 140' respectively, so as to restrict the zone through which the current passes.

When an electrode, 41-41' for example, is supplied with power, the electrical power tends to go through the strip 3 of the layer 1 and heats the strip. An example of this kind of operation is found in FIG. 13.

Figure 14:
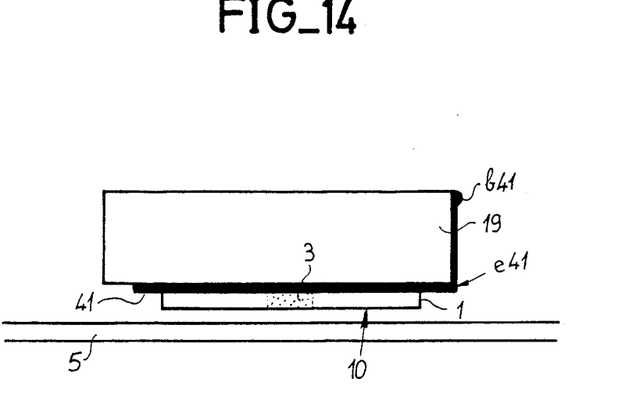
FIG. 14 represents a recording head mounted, according to the invention, on a solid-state integrated circuits element.

According to an alternative embodiment of the invention depicted in FIG. 14, the recording head is made on a solid-state integrated circuits element 19, usually known as a "chip" in integrated circuit technology.

An element 19 of this kind contains the control circuits of the recording head. It possesses connecting terminals such as b41.

On a plane silicium surface of the element 19, the heating electrodes, such as 41, are deposited. These electrodes are connected to one or more output terminals which can be used to control them. The electrode 41a, for example, has its input e41 connected to the terminal b41. The layer 1, which has a strip 3 with a low Curie point, is deposited on the heating electrodes.

We thus get a magnetic recording head made on a solid-state integrated circuits element. This head is placed, as depicted in FIG. 14, in the vicinity of a magnetic recording medium with the free side 10 of the layer 1 located close to the recording medium in such a way that it functions as described earlier.

Figure 15:
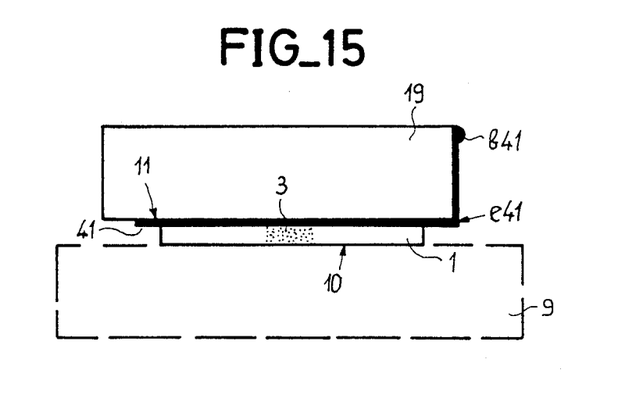
FIG. 15 represents a mode of embodiment of the recording head of FIG. 14.

To make a recording head of this kind, the invention provides for a method depicted in FIG. 15, wherein, first of all, a layer 1, made of a magnetic material, is deposited on a substrate 9, by any method known in the prior art. Subsequently, a low Curie point temperature strip 3 is made in the layer 1, using a doping method mentioned earlier.

Furthermore, all the heating electrodes 4 (electrode 41 in FIG. 15) are deposited on a plane surface of the solid-state integrated circuits element 19. This operation is done by depositing a layer of a resistive conducting material and by etching the electrodes in the layer thus deposited. At the same time as these electrodes are being made, the electrode inputs (e41) are connected to the connecting terminals (b41) of the element 19.

The solid-state integrated circuit element 19 is then bonded to the surface 11 of the layer 10 with the electrodes in contact with the surface 11 and perpendicular to the strip 3.

Finally, the substrate 9 is eliminated by any method suited to the nature of the substrate (such as chemical or mechanical machining) so as to leave the surface 10 of the layer 1 and of the strip 3 free.

In the preceding examples of modes of embodiment, we have considered the case of a layer of magnetic material 1, the magnetization of which is oriented along the plane of the layer.

The invention can also be applied to the case of a layer 1 where the magnetization is perpendicular to the plane of the layer.

Figure 16:
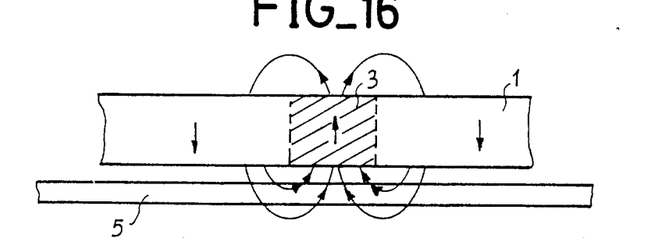
FIGS. 16 to 19 represent alternative modes of functioning of the recording head according to the invention.

According to FIG. 16, the layer 1, set close to the recording medium 5, possesses a zone 3, wherein the orientation of the magnetization is reversed with respect to the rest of the layer 1 located on either side of the zone 3. This zone 3 may be a strip the configuration of which is similar to that of FIG. 8. The reversal of the magnetization in this zone has been obtained definitively by heating above the Curie point.

The recording head is then ready to work.

In an unused state, when the elements (the light sources and the heating electrodes) described earlier do not heat the zone 3, a magnetic flux circulates as depicted in FIG. 16. A relatively high field is induced in the magnetic recording medium 5 and a zone of the magnetic medium is magnetized.

Figure 17:
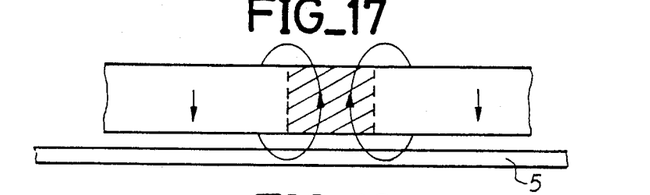

When the zone 3 is heated, it is demagnetized. The field in the vicinity of the zone 3 decreases (FIG. 17). The recording medium 5 is subjected to a magnetic field which is distinctly weaker and is, therefore, not magnetized.

The layer of magnetic material 1, magnetized perpendicularly to the plane of the layer as depicted in FIGS. 16 and 17, can be used in the devices described with respect to FIGS. 1 to 15. By contrast, unlike the devices described earlier, in this case heating up to the Curie point has the effect of reducing the field in the vicinity of the layer 1 towards the recording medium 5 instead of increasing it as in previous cases where the layer 1 is magnetized along the plane of the layer.

Figure 18:
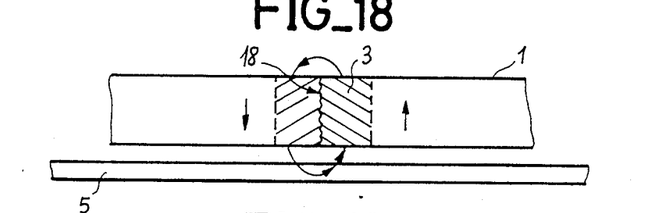

According to FIG. 18, at the location of the zone 3, a discontinuity 18, perpendicular to the plane of the layer, is made along the axis of the zone (or of the strip) 3. This discontinuity is created by ion implantation for example and the magnetization is reversed on either side of this discontinuity.

In the unused state, when the heating mechanisms (light sources and heating electrodes) described earlier do not heat the zone 3, a magnetic flux circulates as depicted in FIG. 18. A relatively high field is induced in the magnetic recording medium 5 and one zone of the recording medium is magnetized.

Figure 19:
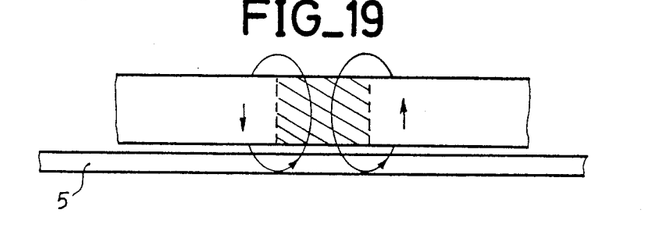

When the zone 3 is heated, it is demagnetized. The field in the vicinity of the zone 3 decreases (FIG. 19). The recording medium 5 is subjected to a magnetic field which is distinctly weaker and is, therefore, not magnetized.

The layer of magnetic material 1, which is magnetized perpendicularly to the plane of the layer as depicted in FIGS. 18 and 19, can be used in the devices described with respect to the FIGS. 1 to 15. As in the layer of magnetic material of FIGS. 16 and 17, heating up to the Curie point results in reducing the field in the vicinity of the layer 1 towards the recording medium 5 instead of increasing it as in the cases described with reference to FIGS. 2 to 15 where the layer 1 is magnetized along the plane of the layer.

We claim:

1. Thermomagnetic recording head adapted for use with a data-recording magnetic medium, comprising a layer of homogeneously magnetized ferromagnetic material at a determined Curie point, the thickness of which is delimited by a first main surface and a second main surface, said layer adapted to being set with its first main surface in the vicinity of the magnetic recording medium; and a heating source set beside the second main surface of the said layer, used to raise the temperature of at least one zone throughout the thickness of the layer starting from the said second main surface up to the first main surface until attainment of the Curie point of the ferromagnetic material that constitutes the layer, wherein said heating source comprises a light source emitting a light beam which impinges on a light valve located between the light source and the first surface of said layer, said light valve having plural sections for selectively passing light from said light source to respective zones of the layer to heat said zones of the layer.

2. Thermomagnetic recording head according to claim 1 wherein the plural sections of the light valve are aligned parallel to the second surface of the layer in such a way that the zones of the layer are aligned and can be used to record lines of data on the magnetic recording medium.

3. Thermomagnetic recording head according to claim 1, wherein the ferromagnetic material of the said layer has a Curie point of less than 150° C.

4. Thermomagnetic recording head according to claim 1 comprising a focusing lens, located between said light valve and the second surface of the said layer and used to focus the light beam emitted by said section of the light valve in a determined zone of the layer.

5. Thermomagnetic recording head according to claim 4 wherein the focusing lens is common to all the light beams passed through the plural sections of the light valve.

6. Thermomagnetic recording head according to claim 1, wherein the light valve is a liquid crystal cell, set parallel to the first surface of the said layer and allowing the light to pass through towards selected zones of the layer.

7. Thermomagnetic recording head according to claim 1, comprising a substrate plate made of transparent material on which the layer of ferromagnetic material is deposited, the second surface of the said layer being in contact with the substrate and the light beam crossing the substrate to reach the layer.

8. Thermomagnetic recording head according to claim 1, wherein the layer of ferromagnetic material comprises at least a first zone and a second zone adjacent to each other, made of ferromagnetic material, respectively possessing a high Curie point and a low Curie point, with the heating means raising the temperature of the layer with the lowest Curie point to a temperature greater than this said Curie point, thus momentarily creating a gap, while the material with the high Curie point is not sufficiently heated and remains magnetic, the result being that the magnetization possessed by this magnetic material obtains a leakage field at the gap thus created, which can be used to record data on a running magnetic medium.

9. Thermomagnetic recording head according to claim 1, wherein the magnetization of the layer of ferromagnetic material, in the absence of heating, is oriented along the plane of the layer.

10. Thermomagnetic recording head according to claim 1, wherein the magnetization of the layer of ferromagnetic material, in the absence of heating, is directed perpendicular to the plane of the layer.

11. Thermomagnetic recording head according to claim 10, wherein, in the said layer, for each zone liable to be heated, the magnetization is oriented, in the absence of heating, in the opposite direction to the rest of the layer.

12. Thermomagnetic recording head according to claim 10, wherein in the said layer, each zone liable to be heated possesses a boundary which, in the absence of heating, delimits two reverse directions along which the layer is magnetized.

13. Thermomagnetic recording head according to claim 1, comprising a magnet located on the side of the initial surface of the layer with the magnetic recording medium placed between the first surface and the magnet, this magnet generating a very weak field in the face of the coercivity of the recording medium and making it possible to orient the magnetization of the layer.

14. Thermomagnetic recording head adapted for use with a data-recording magnetic medium, comprising a layer of homogeneously magnetized ferromagnetic material at a determined Curie point, the thickness of which is delimited by a first main surface and a second main surface, said layer adapted to being set with its first main surface in the vicinity of the magnetic recording medium; and plural heating sources each comprising an electric resistor set beside the second main surface of the said layer, used to raise the temperature of respective zones throughout the thickness of the layer starting from the said second main surface up to the first main surface until attainment of the Curie point of the ferromagnetic material that constitutes the layer, wherein each heating source is an electrode made of resistive metallic material positioned adjacent the second surface of the layer, and a predetermined number of electrodes are arranged in parallel to one another, wherein each electrode has an integrally formed segment of a determined length which has been made more resistive than other remaining segments of the electrode and the temperature of said zone is raised by means of the integrally formed segment of each electrode.

15. Thermomagnetic recording head according to claim 14, comprising a substrate, on one surface of which is deposited each electrode, the entire assembly being covered by said layer, the second surface of this layer being in contact with every electrode.

16. Thermomagnetic recording head according to claim 14, wherein an initial end of each electrode is connected to a common connection input and wherein a second end of each electrode possesses an individual connection input.

17. Thermomagnetic recording head according to claim 14, wherein each electrode is linear and the layer possesses, under each electrode, a strip of ferromagnetic material, perpendicular to the electrodes, the Curie point of which has been reduced in such a way that the heating of an electrode determines demagnetization solely in said strip of said layer at the intersection of this strip with the heated electrode.

18. Thermomagnetic recording head according to claim 14, comprising a solid-state integrated circuit element containing control circuits of the recording head and having, at its surface, connection terminals to these control circuits; a determined number of heating electrodes being set on a plane surface of the solid-state integrated circuit element with each electrode connected to at least one connecting terminal; and one layer of ferromagnetic material deposited on the electrodes.

* * * * *